United States Patent [19]
Robinson

[11] 3,916,898
[45] Nov. 4, 1975

[54] ADMINISTRATION OF MEDICAMENTS AND THE LIKE

[75] Inventor: Terrence J. Robinson, Mosman, New South Wales, Australia

[73] Assignee: G. D. Searle & Co., Chicago, Ill.

[22] Filed: July 10, 1970

[21] Appl. No.: 53,830

Related U.S. Application Data

[63] Continuation-in-part of Ser. No. 649,482, June 28, 1967, abandoned, which is a continuation-in-part of Ser. No. 456,527, May 17, 1965, abandoned.

[30] Foreign Application Priority Data
May 20, 1964   Australia............................ 44703/64
June 30, 1966   Australia............................. 7718/66

[52] U.S. Cl. .................... 128/260; 424/19; 424/22; 128/264; 128/270
[51] Int. Cl.² ......................................... A61M 31/00
[58] Field of Search ........... 128/270, 271, 264, 260, 128/1 R; 424/19, 22

[56] References Cited
UNITED STATES PATENTS 2,541,447   2/1951   Turner et al............................ 119/1
2,895,875   7/1959   Klette .................................. 424/31
2,943,979   7/1960   Elias ............................... 128/270 X
2,987,445   6/1961   Levesque............................ 424/22
3,262,450   7/1966   Elias .................................... 128/270
3,279,996   10/1966   Long et al............................ 424/19

FOREIGN PATENTS OR APPLICATIONS
722,629   6/1955   United Kingdom.................. 424/19
562,095   8/1958   Canada................................. 424/22

OTHER PUBLICATIONS
Nature 206, pp. 39–41, Apr. 3, 1965, Use of Progestagen–Impregnated Sponges Inserted Intravaginally or Subcutaneously for the Control of the Oestrus Cycle in Sheep.

Primary Examiner—Aldrich F. Medbery
Attorney, Agent, or Firm—Mari-Kathleen Zaraza; John J. McDonnell

[57] ABSTRACT

The method of controlling estrus and ovulation, and thus fertility in domestic animals by introducing into the vagina, and later removing, a sponge impregnated with a progestational compound. A sponge, for intravaginal administration in animals, impregnated with a progestational compound.

20 Claims, 2 Drawing Figures

ADMINISTRATION OF MEDICAMENTS AND THE LIKE

CROSS-REFERENCE TO RELATED APPLICATIONS

This application for Letters Patent is a continuation-in-part of Applicant's prior copending application, Ser. No. 649,482 filed June 28, 1967 claiming the priority of an application filed in Australia under Ser. No. 7718/66 on June 30, 1966; which United States application was a continuation-in-part of Applicant's prior copending application, Ser. No. 456,527, filed May 17, 1965 claiming the priority of an application filed in Australia under Ser. No. 44703/64 on May 20, 1964 both U.S. applications being abandoned.

SUMMARY OF INVENTION

This invention relates to the administration of medicaments and the like, and particularly to the administration of progestational compounds to mammals. Specifically, this invention relates to sponges which are impregnated with a progestational compound and which are suitable for intravaginal administration, and it relates to methods for use of such sponges. This invention has special importance in connection with the control of fertility, especially in domestic animals, by the control of ovulation and estrus.

Progestational compounds have been administered both orally and intramuscularly to domestic animals for controlling ovulation. An important purpose of such ovulation control is to achieve near simultaneous release of ovulation in large numbers of animals following cessation of treatment, thus greatly facilitating controlled breeding, e.g., breeding by artificial insemination, natural service or hand service. Another important purpose of ovulation control is to permit the induction of ovulation during the anestrous season in certain breeds of animals. For example, those ewes which naturally have only one breeding season each year can be caused to have an additional breeding season, thus permitting an increase of animal production. Another use of ovulation control is to protect animals such as ewes from forage estrogen. A further use is to regulate the time of breeding of domestic pets such as cats and dogs.

Oral administration of progestational compounds, however, has the disadvantages of expense due to large quantities of compound required, the necessity to hand-feed animals, and the difficulty of regulating the dosage of compound to be administered. Another disadvantage often associated with oral administration for the purpose of controlling fertility is the unreliable and extended periods necessary for the release of ovulation following discontinuation of its use.

Intramuscular injection of progestational compounds is likewise disadvantageous. Where progestational compounds having a relatively short duration of activity are used, injections must be made frequently. For example, injections are made at least every two days for sixteen days when progesterone is used to control ovulation in ewes. Where longer acting progestational compounds are used, the release of ovulation after discontinuance of treatment may be unreliable or unacceptably delayed.

I have found that the progestational compounds can be administered intravaginally to produce systemic effects, for example that effect concerned with the control of ovulation — rather than merely local effects — by means of a sponge impregnated with such a progestational compound. Such a sponge can also be subcutaneously implanted as described by me in Nature 206,39–41 (Apr. 3, 1965).

The use of such a sponge impregnated with a progestational compound additionally can permit good absorption of the compound from the vaginal tract, at low doses, for prolonged periods of time, thus providing an economical method of administration.

Also the use of such an impregnated sponge permits abrupt cessation of treatment by removal of the sponge, thus providing a means for the accurate determination of exactly when treatment is started and when treatment is completed.

These discoveries are surprising in view of, inter alia, the critical nature of the vehicle selected for intravaginal administration, the low doses of compounds needed for intravaginal administration by this means as opposed to the doses for oral or intramuscular administration; and the often found high rate of release of ovulation and of fertility upon insemination of the animal after withdrawal of the sponge, as compared with the results obtained by other routes of administration. I have further found that certain progestational steroids when used with the sponge not only permit the control of ovulation, but also permit the release of estrus at a determinable, short period after discontinuance of its use, along with good fertility rates upon insemination of the animal.

An object of this invention is to provide a more convenient means of administering progestational compounds, namely, a removable implant, i.e. a sponge suitable for intravaginal administration impregnated with a dosage of the progestational compound. By the use of such an impregnated sponge, only one act of administration is required, namely the insertion of the impregnated sponge, and dosage can be regulated relatively accurately. Another related object of this invention is to provide a removable sponge impregnated with a progestational compound in a dosage capable of controlling ovulation, which dosage, if desired, may additionally permit the induction of ovulation at a determinable period after discontinuance of its use. Thus, this invention provides a means for administering medicaments, especially progestational compounds comprising a sponge or other absorptive body adapted to fit into and be implanted in a mucus linear canal of the animal, said sponge being impregnated with the desired medicament.

Another object of this invention is to provide a convenient method of administering progestational compounds to domestic animals comprising the insertion of a removable implant, a sponge, impregnated with the progestational compound into a body cavity, e.g. the vagina of the animal. Such a procedure is particularly valuable for use with domestic farm animals such as ewes, cows, sows, mares and goat does, and with domestic pets such as dogs and cats. Thus, this invention also includes a method of administering medicaments comprising introducing a sponge or other absorbtive body impregnated with said medicaments into a body cavity.

Still another object of this invention is a method of controlling fertility in domestic animals by inserting into the animal a removable implant to be placed in the body to control estrus and ovulation which it retains in the body then to permit the simultaneous release of estrus and ovulation upon removal of the implant. Such purpose can be achieved by inserting into the vagina of the animal a removable sponge impregnated with an ovulation-controlling dose of a progestational compound, which compound permits the induction of ovulation at a determinable period after discontinuance of its use, i.e., by withdrawal of the sponge. The animal comes into heat a short time thereafter, for example, two or three days. When ovulation takes place, the animal can then be inseminated, either by mating or by artificial insemination. Such a procedure is particularly valuable for use with domestic farm animals, such as ewes, cows, sows, mares and goat does. By the use of this method, the simultaneous release of ovulation in large groups of animals can be achieved. Moveover, this procedure can be used to permit the induction of ovulation in some breeds of animals during their anestrous season. For example, treatment with the progestational compound permits the induction of ovulation in the spring, normally an anestrous period for the breeding of ewes, thus providing two breeding seasons per year rather than one. Breeding can also be controlled for various other purposes. In the cold climates, for example, ovulation can be controlled so that breeding will take place at a time when the young will be born in the warmer portions of the year, thus decreasing the chances of the newborns' mortality.

Yet another object of this invention is to provide an especially desirable means for controlling fertility, namely, a removable sponge suitable for intravaginal administration impregnated with an ovulation-controlling dosage of certain progestational steroids that have been found to be very potent, and yet to have a short duration of activity, e.g. 17α-acetoxy-9α-fluoro-11β-hydroxypregn-4-ene-3,20-dione. Sponges impregnated with the aforementioned compound have been found to be exceedingly potent for controlling ovulation and, when their use is discontinued, to permit the release of ovulation in a high percentage of animals with reliable accuracy and within a short period of time.

Another highly desirable feature of the use of such an impregnated sponge is the fact that discontinuance of its use generally permits near-simultaneous ovulation and behavioral estrus, thus providing an overt indication of ovulation.

An exhaustive treatment of the sponge and methods of this invention as applied to ewes is found in my book, "The Control of the Ovarian Cycle in the Sheep", Sydney University Press 1967.

The drawings illustrate one embodiment of the sponge of this invention:

The sponge of this invention can be manufactured from a variety of relatively elastic, porous and preferably absorptive materials. Especially useful materials are elastic, porous and abosrptive plastics, particularly polyurethanes of the polyester or polyether type. Polyether urethanes are most convenient for use. Other sponge materials are natural sponge, natural or synthetic rubber, polyvinylchloride and polyethylene.

Figure 1:
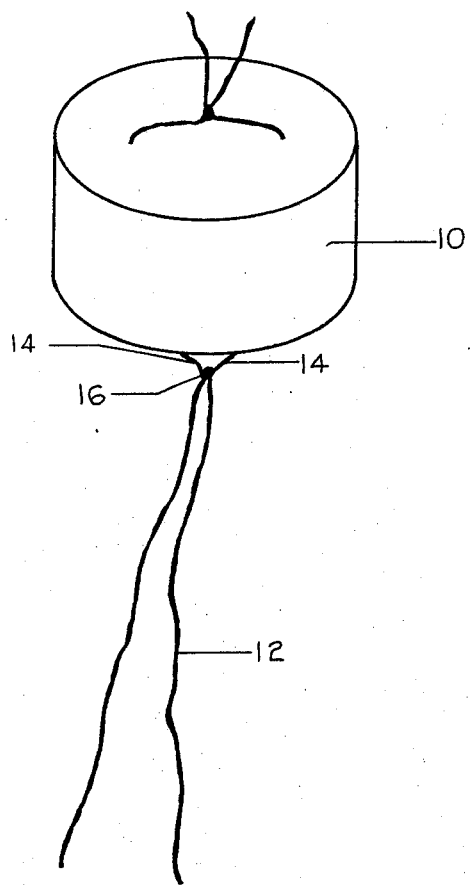
FIG. 1 is a perspective view of the sponge.
Figure 2:
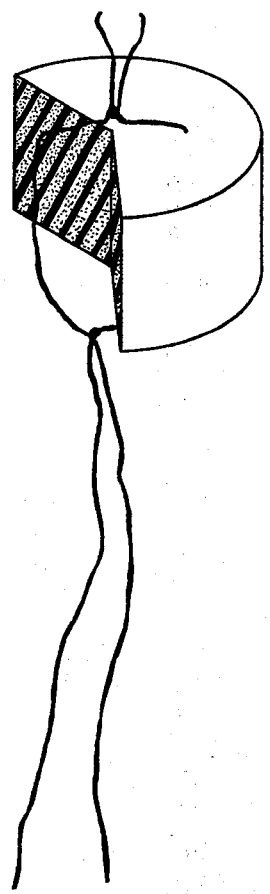
FIG. 2 is a perspective view of the sponge, partially in section.

The sponge is made suitable for intravaginal administration by so shaping and sizing the material from which it is made to be conveniently inserted into and retained by the animal involved. Thus, as shown in FIGS. 1 and 2 a cylindrical sponge may be convenient for such a use. As a specific example, a sponge for use with ewes can be prepared from a polyurethane sheet, about 2.5 cm. in thickness, by cutting out cylindrical shapes with a borer having a diameter of 2.5 to 3.0 cm.

The optimum sponge sizes will, of course, depend upon the vaginal dimensions of the animal involved. Particularly useful sponge sizes for many breeds of mature ewes (having had at least one lamb), e.g., Merino, Dorset, and Border-Leicester, are those having a 0.75 inch (1.9 cm.) to 1.4 inch (3.5 cm.) diameter with a 1 inch (2.5 cm.) to 2 inch (5.1 cm.) height. For young maiden ewes, a 0.5 inch (1.3 cm.) to 1 inch (2.5 cm.) diameter sponge of 0.5 inch (1.3 cm.) to 2.0 inch (5.1 cm.) height can be used.

To facilitate removal of the sponge, as illustrated in FIGS. 1 and 2, a string 12 can be passed through the sponge 10 twice so as to form a loop, the ends 14 of which is tied to form knot 16. The ends 14 of this string 12 are long enough to protrude from the vagina after insertion of the sponge and it can be used for withdrawal. A number of alternative methods of attaching strings to the sponges, e.g., a single string attached to a button or cemented to the sponge, can be used. Linen, cotton, nylon, polyolefins and polyester fiber strings can be used. Nylon and polypropylene monofilaments are particularly useful.

To facilitate the retention of sponges for use with the cow, irregularly shaped sponges having undercut projections rather than plain cylindrical or spherical shapes are desirable.

Progestational compounds, in general, can be used for impregnation of the sponge. The term "progestational compound" used here means those compounds which are capable of controlling ovulation, and thus estrus, in a particular animal (both during the breeding season and in the non-breeding season where seasonal ovulators are involved). The term progestational compound includes both steroidal compounds, i.e., "progestational steroids," and non-steroidal compounds. The literature is abundant with reference to compounds capable of controlling ovulation.

A variety of progestational compounds are advantageous for use with the sponge. One useful group of progestational steroids is the 9α-halo series, and particularly those of the formula

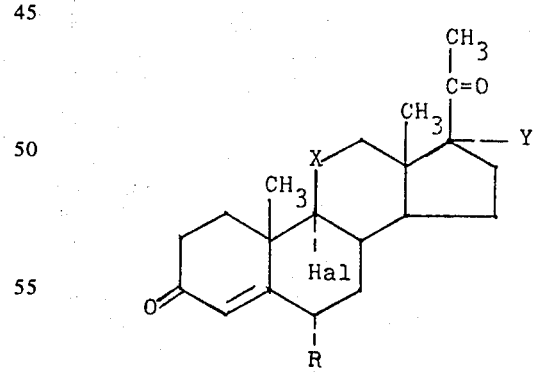

wherein X is a β-hydroxymethylene or carbonyl radical, Hal is a fluoro, chloro or bromo atom, Y is hydrogen or a lower alkanoyloxy radical of the formula —O—CO—(lower alkyl) and R is hydrogen or the methyl radical. The lower alkyl groupings referred to above and hereinafter include methyl, ethyl, propyl, butyl, pentyl, and hexyl radicals, and the branched-chain isomers thereof. The high potency which has been found for compounds of the above formula wherein Y is hydrogen when used intravaginally, as compared with the potency of the corresponding compounds in which Y is a lower alkanoyloxy grouping such as acetoxy, is surprising in view of the fact that subcutaneous Clauberg assay data suggest that the latter group of compounds would be more potent than the former group. However, as an example, 9α-chloro and 9α-fluoro-11β-hydroxypregn-4-ene-3,20-dione each appear to be at least equipotent to the corresponding 9α-fluoro-17α-acetoxy compound; but on the basis of subcutaneous Clauberg assay data it would be expected to have less than one-eighth the potency of that 17α-acetoxy compound.

Another useful group of progestational agents is progesterone and its closely related analogs of the formula

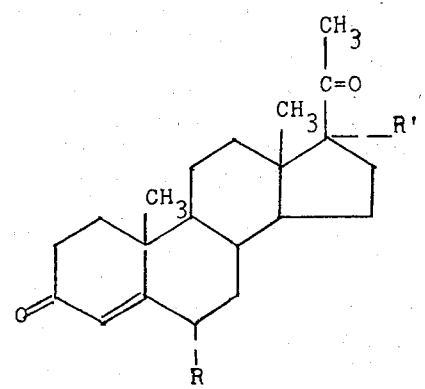

wherein R is defined as above, and R' is hydrogen or a radical of the formula —O—CO—(lower alkyl). Other suitable progestational steroids are 17α-ethynylestr-4-ene-3β,17β-diol 3,17-diacetate, 17α-acetoxy-6-methylpregna-4,6-diene-3,20-dione and the 17-lower alkanoyl esters thereof. Other progestational agents which can be used with this invention are 17β-hydroxy-17α-methallylestr-4-en-3-one, 16α,17α-(methylphenylmethylenedioxy)pregn-4-ene-3,20-dione, 3β,17β-dihydroxy-17α-methallylestr-4-ene 3-acetate, 9β,10α-pregna-4,6-diene-3,20-dione, 17α-ethynyl-17β-hydroxy-13β-ethylgon-4-en-3-one, and steroids of the formula especially 17α-acetoxy-16-methylene-6-methylpregna-4,6-diene-3,20-dione, 6,17α-dimethylpregna-4,6-diene-3,20-dione, 17α-acetoxy-6-chloro-1α,2α-methylenepregna-4,6-diene-3,20-dione, 17α-acetoxy-6α-methylpregna-4-en-20-one, and 3β,17α-diacetoxy-6α-methylpregn-4-ene-20-one. Still another group of useful progestational agents are those of the formula especially 17α-acetoxy-6-chloropregna-4,6-diene-3,20-dione.

Where the progestational compound is to be used to control ovulation, but it is desired to induce ovulation at a determinable period after discontinuance of its use, it is desirable to use a compound having highly specific and potent progestational activity and having a short duration of activity; these characteristics are typified by the naturally occuring steroid, progesterone. This type of compound can be termed for convenience "an ovulation and estrus synchronizing progestational steroid." Especially useful for this purpose are those synthetic steroids which have been found to be similar to progesterone in this respect, such as 17α-acetoxy-9α-fluoro-11β-hydroxypregn-4-ene-3,20-dione, 9α-fluoro-11β-hydroxypregn-4-ene-3,20-dione, 9α-chloro-11β-hydroxypregn-4-ene-3,20-dione, 17β-hydroxy-17α-methallylestr-4-en-3-one and 17α-acetoxy-6α-methylpregn-4-ene-3,20-dione. Withdrawal of the sponges containing the latter steroids is generally followed by ovulation and estrus within about a one- to four-day period in sheep and cattle. The animal can then be mated artifically inseminated and a relatively high percentage of conception results.

The sponge can remain in place for a period of weeks or months, if necessary, during which time the progestational compound is progressively released and ovulation is inhibited. Sponges have been left in place for from 10 to 30 days with success, e.g. long enough to span a complete estrus cycle or longer if desired.

Control of ovulation, and thus the breeding cycle, is effected by continual administration of the appropriate progestational compound in an ovulation-controlling dose, impregnated on the sponge, given either alone or in combination with other hormones such as estrogens or androgens, for a predetermined time, suitably 16 to 21 days in ewes and 21 to 25 days in goat does, cows, sows and mares. Such treatment suppresses ovarian activity in cyclic animals (those which are in the period of the year when they can normally be bred) and conditions acyclic animals (those which are in the period of the year when they cannot normally be bred) to respond to subsequent treatment with suitable gonadotropins. Following withdrawal of the sponge and thus cessation of treatment, the cyclic animal ovulates under the influence of its own gonadotropins. The acyclic animal may be induced to ovulate within 3 days of withdrawal of the sponge by the injection at the time of withdrawal of a suitable gonadotropin, e.g., pregnant mare serum in a dose of about 250 to 1000 International Units (IU) for sheep and about 1500 IU for cattle. Gonadotropin similarly may be used as an adjunct to the use of the impregnated sponge in cyclic animals. In either case the animal usually comes into estrus. The time of injection of gonadotropin relative to the time of withdrawal is important for obtaining the desired result.

Such control of the time of ovulation is of value for purposes as previously described in which progestational compounds are used, as a result of the method of impregnation employed the progestational compound, which is often insoluble in aqueous media, is finely dispersed throughout the highly porous sponge. Thus, body fluids have access to a large surface area of the compound so that despite its insolubility in certain cases, it can be slowly dissolved and absorbed into the animal's system in quantities large enough to be effective.

Various analytical techniques show that the quantity of steroid absorbed from the implant as related to duration of implantation was almost a linear semilog relationship, an average of about 16%, but with considerable variation from sponge to sponge of the steroid present at any time being absorbed each day. Generally, the denser the sponge the slower the rate of absorption.

The dosage of progestational compound to be employed for use with the sponge is that capable of controlling ovulation in the particular animal to be used over the period of use i.e. an ovulation-controlling dose and is, of course, dependent upon the particular steroid to be employed. Although there are variations in the minimal effective doses for given progestational steroids based on the intended use of the progestational compound, the breed of the animal, the presence or absence of estrus, the length of time the animal is to be exposed to the steroid, the presence or absence of lactation, the season of the year and like factors apparent to those skilled in the art of animal pharmacology, certain generalizations can be made with respect to selected steroids. These can be summarized as follows:

APPROXIMATE MINIMUM EFFECTIVE DOSES IN EWES FOR THE CONTROL OF OVULATION.

| Compound | Approximate Minimum Effective Dose per Period |
| --- | --- |
| Progesterone | about 350 mg./16-day period |
| 17α-Acetoxy-9α-fluoro-11β-hydroxypregn-4-ene-3,20-dione | about 5 mg./16-day period |
| 17α-Acetoxy-6α-methylpregn-4-ene-3,20-dione | about 5 mg./16-day period |
| 17α-Ethynylestr-4-ene-3,17β-diol 3,17-diacetate | about 20 mg./16 day period |
| 17β-Hydroxy-17α-methallylestr-4-en-3-one | |

Although not intending to be limited to any theory of operation it has been suggested that progestational compounds used for estrus synchronization
  a. prevents ovulation in cyclic animals
  b. prevents estrus in cyclic animals
  c. renders the animal highly sensitive to endogenous estrogens and pituitary gonadotropins
  d. conditions the reproductive tract so as to assist fertilization and development of the eggs.

In normal breeding seasons, withdrawal of the impregnated sponge, which automatically ceases the hormonal treatment generally may permit the release of pituitary gonadotropins. Ovulation occurs and the animal may be mated or artificially inseminated. In sheep and cattle this can occur 2 to 3 days after withdrawal. To insure optimum results in the entire group of animals used, doses of 2 to 10 or more, times the minimum can be used. Higher multiples can be uneconomic thus, additional observations can be made with respect to the use of 17α-acetoxy-9α-fluoro-11β-hydroxypregn-4-ene-3,20-dione. At the 5 mg. dose using 117 non-breeding Merino ewes, 57% control of cycles was obtained. When this compound was used at a 10 mg. dose over a 16-day period, in breeding animals behavioral estrus and ovulation occured in 95% of the treated ewes between 30 and 72 hours after removal of the sponge. At the 20 mg. dose, estrus occurred between 36 and 84 hours after removal, and at the 40 mg. dose estrus occurred at between 48 and 108 hours after removal. At all these dosage levels, sponges were removed 16 to 20 days after insertion. It has been further found that ovulation relative to the time of onset of estrus bears a similar time relationship to that observed in the normal cycle. Thus, ovulation occurs 12 to 24 hours after treated ewes are first observed in estrus.

APPROXIMATE MINIMUM EFFECTIVE DOSES IN COWS FOR THE CONTROL OF OVULATION.

| Compound | Approximate Minimum Effective Dose per Period |
|---|---|
| Progesterone | about 1000 mg./21-day period |
| 17α-Acetoxy-9α-fluoro-11β-hydroxypregn-4-ene-3,20-dione | about 30 mg./21-day period |

Additional observations can be made with respect to the use of 17α-acetoxy-9α-fluoro-11β-hydroxypregn-4-ene-3,20-dione. When this compound was used at a 100 mg. or 200 mg. dose over a 21-day period behavioral estrus and ovulation occurred in 80% of the treated cases between 36 and 96 hours after removal.

The maximum amount of progestational steroid that can be impregnated into the sponge is limited by the available volume of the sponge itself. Although pregestational steroids tend to have a density of roughly 1.2 grams per cubic centimeter ($g/cm^3$), in practice it is difficult to impregnate a mere 800 mg. of microcrystalline progesterone (less than 1 $cm^3$) on a 12 $cm^3$ volume.

Although progestational agents in general can be used with the sponges for controlling ovulation, certain such agents are especially useful because they permit the induction of ovulation at a relatively short, determinable period after discontinuance of their use, i.e. ovulation and estrus synchronizing progestational steroids. These can be determined readily by one skilled in the art, if desired, by the following procedure. Groups of spayed ewes are subcutaneously or intramuscularly injected with a selected dose, suitably between 0.05 and 20 mg., of a progestational compound given daily for 12 days. (The initial dose of progestational compound can be selected by referring to its activity in the standard progestational tests, e.g. the Clauberg assay. Thus, progesterone which has a minimal effective dose administered subcutaneously in the Clauberg of 0.05 mg./rabbit/day is used in this test at about 200 times that dosage, i.e., 10 mg./ewe/day. Other compounds have been found active at a dose as low as 50 times the minimal effective subcutaneous dose in the Clauberg. At a given time after cessation of treatment with the progestational compound, suitably 2 or 4 days, the spayed ewe receives a subcutaneous injection of a standard dosage, suitably 12 to 20 μg, of 3-benzoyloxyestr-1,3,5(10)-trien-17β-ol (estradiol benzoate). A positive response is indicated by behavioral estrus (the disposition of the female to search out and/or attract intact or vasectomized males of the same species) and by vaginal estrus (the cellular and mucous make-up and structural characteristics indicating estrus). The desirable compounds in particular dosage for this synchronization of estrus and ovulation are those which will condition the spayed ewes in this test to respond to a subcutaneous dose of 10 to 20 μg or less of estradiol benzoate, administered on the second to fourth day after termination of the administration of the progestational compound. This spayed ewe test thus also provides one means of determining daily dosages of compound required.

The sponge can be impregnated with the steroid by a variety of methods. One method is to dissolve the steroid to be used in a relatively low boiling point solvent, applying the resulting solution to the absorptive sponge and allowing the solvent to evaporate, either at room temperature or in a drying oven. In this manner the steroid can be distributed evenly throughout the sponge. As a specific example, 10 to 30 mg. of 17α-acetoxy-9α-fluoro-11β-hydroxypregn-4-ene-3,20-dione is dissolved in about 10 ml. of ethanol, and the resulting solution is pipetted onto a cylindrical polyurethane sponge of about 2.5 cm. in height and having a diameter of about 2.5 to 3.0 cm. and a thread extending therefrom. The ethanol solution which has been absorbed by the sponge is then allowed to evaporate at room temperature, leaving particles of the steroid dispersed throughout the sponge.

Anti-biotics and bacteriostats can also be added to the sponge before or after impregnation to aid in the control of infection. Likewise, estrogens or androgens can also be added to the sponge, e.g., to control the rate of growth and other functions of the animals.

Small quantities of estrogens, androgens and other compounds have been administered with the progestational compound and have been found to augment the estrous response without impairing fertilization. Such compounds may be administered by incorporation into the sponge or by injection while the sponge is in place or after its removal.

Two methods of insertion into the vagina of the animals have been used. For the first, a duckbilled speculum is used. The vagina is dilated and the sponge is pushed as far as possible into the anterior vagina with a plastic rod. The second method employs a simple applicator—a tapered plastic tube angle cut at the insertion end and slightly belled out at the other. A rod of similar material is used to force a sponge down the tube which is then inserted as far as possible into the vagina. The sponge is gently forced out with the rod. In both methods the speculum (or applicator) and rod are withdrawn leaving the sponge in place. In mature cows, sponges may simply be inserted by hand.

Sponges can be left in place long enough to span one complete estrous cycle or longer if desired. They can be removed about 2 days before estrus is desired. The intravaginal sponge can be removed simply by pulling its string. If the sponge has not been provided with a string or if a string breaks or pulls out of the sponge, the sponge can be removed by dilation of the vagina and withdrawal with forceps.

It is to be understood that this invention is not limited to the exact details of operation or the exact compounds or compositions shown and described, for obvious modifications and equivalents will be apparent to one skilled in the art.

What is claimed is:

1. The method of controlling fertility of domestic farm animals, which comprises the administration of a removable sponge impregnated with a progestational steroid, permitting the sponge to remain in the animal to continuously release the steroid and inhibit ovulation, followed by removal of the sponge prior to the time insemination of the animal is to occur.

2. The method of claim 1, in which the sponge is administered intravaginally and the amount of steroid is at least a minimum effective, 16 day total dose.

3. The method of claim 2, in which the sponge is removed at about 16 to 25 days after insertion.

4. The method of claim 2, in which the progestational steroid is selected from the group consisting of progesterone, 17α-acetoxy-9α-fluoro-11β-hydroxypregn-4-ene-3,20-dione, 9α-fluoro-11β-hydroxypregn-4-ene-3,20-dione, 9α-chloro-11β-hydroxy-pregn-4-ene-3,20-dione, 17β-hydroxy-17α-methallylestr-4-en-3-one, 17α-acetoxy-6α-methylpregn-4-ene-3,20-dione, 17α-acetoxy-6-chloropregna-4,6-diene-3,20-dione, and 17α-acetoxy-6-methylpregna-4,6-diene-3,20-dione.

5. The method of claim 4, in which the sponge is impregnated with at least 5 milligrams of 17α-acetoxy-9α-fluoro-11β-hydroxypregn-4-ene-3,20-dione per 16 day period in which the sponge is to remain in the vagina.

6. The method of claim 5, in which the sponge is impregnated with about 10 to 40 milligrams of 17α-acetoxy-6α-methylpregn-4-ene-3,20-dione.

7. The method of claim 4, in which the sponge is impregnated with at least 5 milligrams of 17α-acetoxy-6α-methylpregn-4-ene-3,20-dione per 16 day period in which the sponge is to remain in the vagina.

8. A removable sponge suitable for intravaginal administration in domestic animals and impregnated with a progestational compound in an amount of at least a minimum effective, sixteen day total day dose.

9. The sponge of claim 8, in which the progestational compound is an ovulation and estrus synchronizing steroid.

10. The sponge of claim 9, in which the steroid is selected from the group consisting of progesterone, 17α-acetoxy-9α-fluoro-11β-hydroxypregn-4-ene-3,20-dione, 9α-fluoro-11β-hydroxypregn-4-ene-3,20-dione, 9α-chloro-11β-hydroxypregn-4-ene-3,20-dione, 17β-hydroxy-17α-methallylestr-4-en-3-one, 17α-acetoxy-6α-methylpregn-4-ene-3,20-dione, 17α-acetoxy-6-chloropregna-4,6-diene-3,20-dione, and 17α-acetoxy-6-methylpregna-4,6-diene-3,20-dione.

11. The sponge of claim 10, impregnated with at least 350 milligrams of progesterone.

12. The sponge of claim 10, impregnated with at least 5 milligrams of 17α-acetoxy-9α-fluoro-11β-hydroxypregn-4-ene-3,20-dione.

13. The sponge of claim 12, impregnated with from about 10 to 40 milligrams of 17α-acetoxy-9α-fluoro-11β-hydroxypregn-4-ene-3,20-dione.

14. The sponge of claim 10, impregnated with at least 5 milligrams of 17α-acetoxy-6α-methylpregn-4-ene-3,20-dione.

15. The sponge of claim 10, impregnated with at least 10 milligrams of 17β-hydroxy-17α-methallylestr-4-en-3-one.

16. The sponge of claim 10, suitable for intravaginal administration in the cow and impregnated with at least 1000 milligrams of progesterone.

17. The sponge of claim 10, suitable for intravaginal administration in the cow and impregnated with at least 30 milligrams of 17α-acetoxy-9α-fluoro-11β-hydroxypregn-4-ene-3,20-dione.

18. An estrus block and enhancement technique which comprises:
   i. surgically inserting into a female domestic animal an implant of a medicament whose pharmacologic action blocks occurrence of estrus.
   ii. permitting the implant to remain in the animal and continuously release medicament for about 16–18 days, said implant being adapted to release medicament continuously for at least 18 days.
   iii. surgically removing said implant at the expiration of said 16–18 day waiting period, thereby halting medication, whereby a rebound phenomenon enhances estrus and onset of estrus occurs in from 2–4 days following removal of said implant.

19. The method of claim 18, wherein multiple numbers of female animals are implanted at one time and implants are removed at one time and synchronized estrus in the so treated group is attained.

20. The method of claim 18, wherein the female animal is artificially inseminated daily during said 2–4 day period.

* * * * *